(12) United States Patent
Mittal

(10) Patent No.: US 8,442,902 B2
(45) Date of Patent: *May 14, 2013

(54) SYSTEM, METHOD AND PROGRAM FOR PREVENTING GAMING IN A TRADING SYSTEM

(75) Inventor: Hitesh Mittal, Edison, NJ (US)

(73) Assignee: ITG Software Solutions, Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/399,429

(22) Filed: Feb. 17, 2012

(65) Prior Publication Data

US 2012/0150717 A1    Jun. 14, 2012

Related U.S. Application Data

(63) Continuation of application No. 12/000,892, filed on Dec. 18, 2007, now Pat. No. 8,121,933.

(60) Provisional application No. 60/875,420, filed on Dec. 18, 2006.

(51) Int. Cl.
*G06Q 40/00*    (2012.01)

(52) U.S. Cl.
USPC .............................. 705/37; 705/35; 705/36 R

(58) Field of Classification Search .................. 705/35, 705/36 R, 37
See application file for complete search history.

(56) References Cited

U.S. PATENT DOCUMENTS

| 7,562,046 B2 | 7/2009 | O'Callahan |
| 7,653,588 B2 | 1/2010 | Tilly et al. |
| 2006/0253354 A1 | 11/2006 | O'Callahan |
| 2006/0253380 A1 | 11/2006 | Adcock et al. |

OTHER PUBLICATIONS

SEC to prove Qwest trades Deals kept shares above 'collar' set in MCI bid Manipulative trading is against the law. Hedge funds and other inventors face regulatory scrutiny.; [Final Edition] Ross Wehner Denver Post Staff Writer. Denver Post. Denver, Colo.: May 5, 2005. p. C01.

The Insiders' Magic Way to Sell; SEC Investigates Securities Firms That Used Derivatives Contracts to Help Executives Trade Quietly Randall Smith and Jesse Eisinger, Wall Street Journal. (Eastern edition). New York, NY.: Mar. 19, 2004, p. C1.

The striking price: A bull, a bear, and a collar Cochran, Thomas N. Barron's. New York, NY.: Nov. 21, 1994. vol. 74, Iss. 47; p. MW12 (1 page).

*Primary Examiner* — Lalita M Hamilton
(74) *Attorney, Agent, or Firm* — Rothwell, Figg, Ernst & Manbeck, P.C.

(57) ABSTRACT

System, method, and program for preventing gaming in a trading system. The systems, methods and programs can receive an order from a trader to trade securities in an alternative trading system, determine if gaming is occurring, set a price collar for the order, and submit the order to the alternative trading system with the price collar.

18 Claims, 5 Drawing Sheets

SYSTEM, METHOD AND PROGRAM FOR PREVENTING GAMING IN A TRADING SYSTEM

REFERENCE TO RELATED APPLICATION

This application is a Continuation of and claims priority to U.S. patent application Ser. No. 12/000,892, filed Dec. 18, 2007, which claimed priority to provisional application No. 60/875,420, filed Dec. 18, 2006, the contents of each of which are incorporated herein in their entirety.

BACKGROUND OF THE INVENTION

1. Field of the Invention

This invention relates generally to systems and methods for improving the quality of liquidity of commodities, such as stocks. Particularly, this invention relates to systems and methods preventing gaming of trading forums in computerized trading and alternative trading systems.

2. Background of the Related Art

The liquidity of a stock refers to the owner's ability to buy or sell that stock without any, or at least with minimal change in value. If a stock is not highly liquid, then the owner may be concerned that selling a large number of shares may depress the price that the stock is sold at.

Maximizing liquidity in the marketplace generally requires a large number of matching offers at matching prices. Thus, if a trader would like to sell 400 shares of XYZ stock at the current price, then that trader would seek out as many contra parties who desire to buy shares of XYZ stock for at least the current price. The difficulty arises in that other traders can vary their trading strategies, and particularly, their pricing strategies, based upon knowledge about trades for particular stock. In this case, when the trader sells all 400 shares in a single transaction, then there is no opportunity for price movement and no liquidity problems can arise. However, if the trader sells only a portion of a total order, say 100 shares, then there is a risk that potential purchasers for the remaining shares will have knowledge about the transaction involving the first 100 shares have just been sold. Such knowledge can be used to "game" a trade. Such gaming is prevalent with electronic trading.

In electronic trading, there are generally two types of executing destinations for electronic orders: displayed and non-displayed. Orders transmitted to a displayed destination are published, i.e., the bids and offers are published to parties that subscribe to the destination. The NYSE, NASDAQ and ECNs (e.g., LAVA, BITS, etc.) are examples of displayed destinations.

In non-displayed destinations, orders are not published, i.e., bids and offers are not displayed to outside parties and therefore, the orders are hidden. Non-displayed destinations, or hidden liquidity pools, are commonly called "dark" destinations or pool. Non-displayed destinations are typically known as Alternative Trading Systems (ATS's) and include Pipeline, ITG POSIT, LIQUIDNET, BIDS and others.

ATS's are attractive destinations for block trading because information leakage is minimized or eliminated when orders are submitted to these non-displayed destinations. Even though non-displayed destinations typically have less available liquidity than displayed destinations, ATS liquidity is extremely valuable to institutional traders due to the minimized information leakage. For example, if a trader wants to buy 1 million shares of a stock and initially sends an order to buy 100,000 shares to a displayed destination, then this order information will be available to all parties subscribing to the market data. Consequently, sellers will now be willing to sell only at much higher prices, thus the stock price will move up. On the other hand if the same order is submitted to an ATS, the information is not available to other traders and the stock price may not move.

Even though ATS's are non-displayed, they can still be vulnerable to gaming because ATS's generally have fewer parties trading than displayed destinations. Thus, there is a need for new and improved systems and methods for preventing gaming in non-displayed trading destinations. Such systems and methods will improve the desirability of non-displayed trading destinations and accordingly, can result in high liquidity and even further decreased risk of gaming in that destination.

SUMMARY OF THE INVENTION

According to the present invention, systems, methods, and computer programs are provided for preventing gaming in a trading system. The systems, methods and programs can receive an order from a trader to trade securities in an alternative trading system, determine if gaming is occurring, set a price collar for the order, and submit the order to the alternative trading system with the price collar.

According to an embodiment of the present invention, a computer implemented method is provided for preventing gaming of at least one alternative trading system. The method may includes steps of receiving a plurality of orders to trade securities in an alternative trading system from a plurality of traders, determining whether a predatory order exists in the plurality of orders, setting a price collar for each order in the plurality based on results, and submitting each order to the alternative trading system with the price collar.

According to an embodiment of the present invention, a computer-readable medium storing computer-executable instructions for preventing gaming of at least one alternative trading system is provided. The operations of the program may include receiving a plurality of orders to trade securities in an alternative trading system from a plurality of traders, determining whether a predatory order exists in the plurality of order, setting a price collar for each order in the plurality based on results of the determining step, and submitting each order to the alternative trading system with the price collar.

According to an embodiment of the present invention, a system for preventing gaming in a trading system includes a trading facility configured to receive a plurality of orders to trade a tradable asset from at least one trader via an electronic network, to access trading information relating to trading activity in at least one alternative trading system for the tradable asset, to determine whether gaming is occurring for the tradable asset, and setting a price collar for each of the plurality of orders, a value of the price collar being based on whether gaming is occurring, and to transmit the plurality of orders with the price collars to the alternative trading system.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

DETAILED DESCRIPTION OF THE PREFERRED EMBODIMENTS

Figure 1:
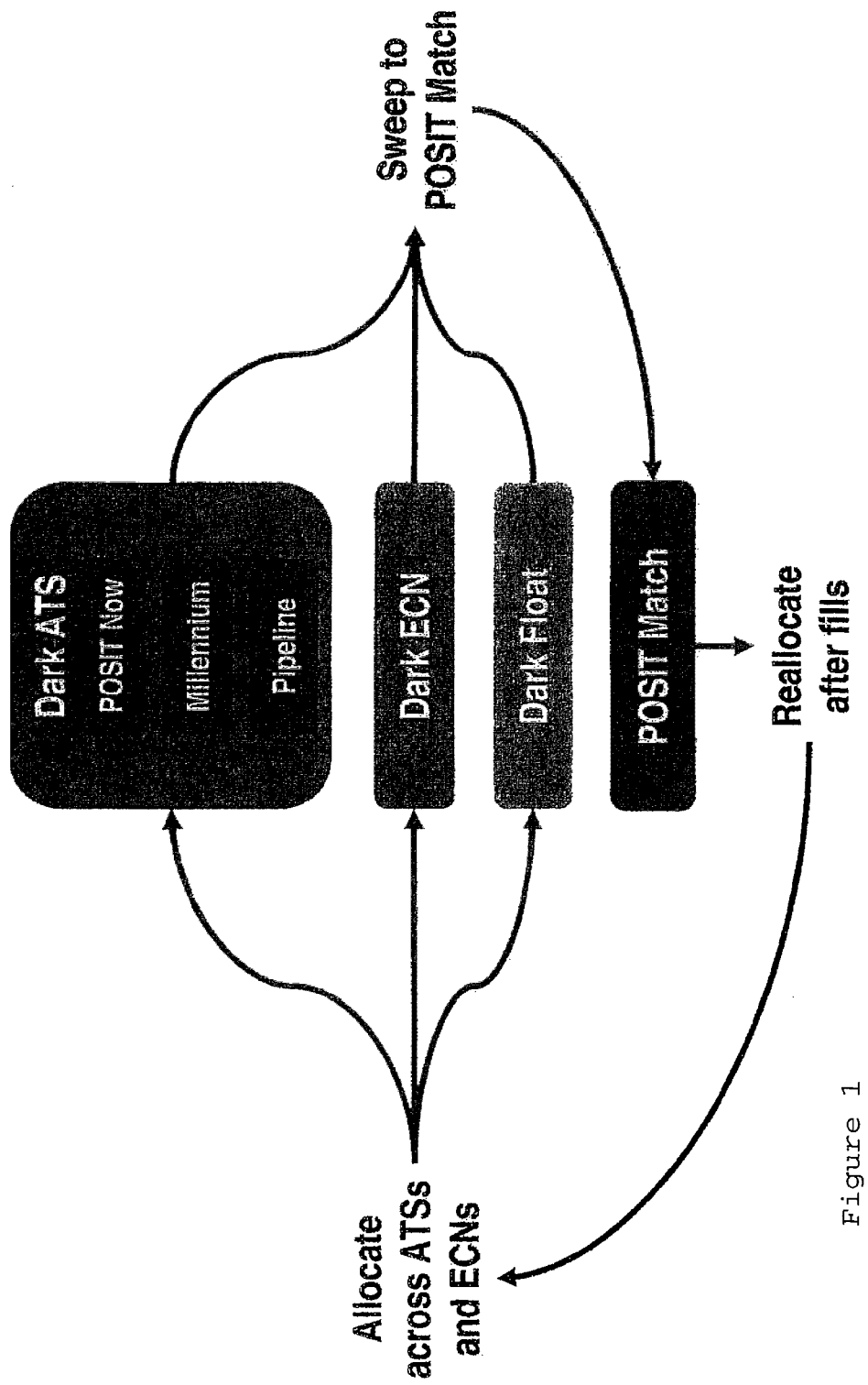
FIG. 1 is a flowchart of an exemplary work flow for allocating orders across ATS's and ECNs according to embodiments of the present invention.

Information leakage in an ATS can be a particularly acute problem. Unlike displayed destinations, the trader that is the victim of the leaked information may be unaware that a "predator" has the leaked information. There are many ways that information can be leaked out of an ATS, allowing a user to learn that a symbol is active in that ATS.

A trader may learn that there is a SELL order for a symbol by sending a small BUY order to an ATS and determining if the BUY order is executed. If the BUY order is not executed, then a trader may send a SELL order for the same symbol, having cancelled the BUY order, in order to determine if there is a BUY order for that symbol. If neither the BUY order nor the SELL order are executed, this is evidence that the symbol is not currently active in the ATS.

Additionally, proprietary traders may have access to information about the orders in an ATS that are being offered by the same firm. If an ATS signals users concerning orders currently in the ATS, then it is even easier to determine if a symbol is active in the ATS. There are other methods used by traders that would be known to one of ordinary skill in the art, to determine if a symbol is being actively traded in an ATS.

Leaked information may be exploited by opportunistic traders, or "predators," to the detriment of other traders. For example, if an ATS predator determines that there is a large SELL order for symbol XYZ in an ATS, then that predator can start submitting SELL orders for the same symbol in the open market, using aggressive orders to move the price of the spread downward. Once the price of the spread is moved downward satisfactorily, the predator can then execute a large BUY order at the lower price in that ATS, thereby achieving a price improvement and locking the profit from the transaction at the detriment of other unknowing traders. These kinds of practices are considered to be gaming practices.

Different Approaches to Liquidity in ATS's

ATS's often have different policies or trading logic resulting in different levels of liquidity available at each ATS. Selected examples of these differences are found below:

1. ATS's are exposed to different types of customers. ATS's are typically exposed to institutional buy-side firms only, brokers, computerized trading algorithms, and/or statistical arbitrage firms. Some ATS's accept retail liquidity in addition to institutional liquidity. The nature of the participants in an ATS determines the quality of liquidity for that ATS. For example, if an ATS is exposed to statistical arbitrage firms, then the liquidity of that ATS is considered lower quality.

2. ATS's often require a minimum order quantity in order to submit an order to the ATS. Generally, larger the minimum order quantity limitation results in better quality executions in the ATS, and as a result, less information leakage will occur. With less information leakage there is a reduced risk of predatory gaming and an increase in the quality of the liquidity on the ATS.

3. Some ATS's allow "Immediate or Cancel" (IOC) type orders, which cancel if the order is not executed immediately upon receipt into the ATS. If an ATS does not have a minimum order quantity limitation, traders can use small IOC orders to "ping" the ATS, whose execution identifies the existence of the other side to a trade. By this technique, information is obtained about the liquidity in a non-displayed trading forum. Thus, a lack of a minimum order quantity limitation can expose an ATS to trading techniques that could be used by predators, and the quality of liquidity in the ATS can be reduced.

4. Some ATS's send signals to their traders if the ATS receives an order if the customer also has submitted an order for an asset of the same symbol. Other ATS's send indications when it receives orders that have the same symbol and but are the opposite side as the customers. Still other ATS's allow customers to request information about a particular symbol (even though the customer does not have an order for that symbol). Because these ATS's are liberally distributing trade information, an ATS increases the risk that its traders can be exposed to predatory practices and reduces the quality of liquidity at the ATS.

5. Some ATS's conduct periodic quality control checks to prevent misuse of the ATS where traders discuss the side and size of the order and export this information in the displayed market or ATS. While not all ATS's conduct these checks, those that do help to improve the quality of liquidity in each individual ATS.

6. Some ATS's allow their proprietary traders to send their orders through their ATS and some do not. This may also affect the quality of that ATS liquidity.

In brief, even though the liquidity provided by ATS's is extremely valuable to the institutional trader due to less information leakage as compared to displayed destinations, there are different properties associated with each ATS that makes its liquidity more or less desirable.

FIG. 1 illustrates an exemplary work flow for a trade router system, such as ITG's DARK SERVER, that routes orders to "dark" pools. As shown, orders can be routed from a single source to numerous locations, such as dark ATS's, dark ECN's, or Dark Float. According to one example, a single order submitted by a trader can be divided into multiple, smaller orders, which are simultaneously sent to multiple non-displayed destinations, thus exposing hidden liquidity. Shares can be dynamically reallocated as an order in any given destination is completely executed. Such processes may be referred to as "liquidity aggregators."

In this example, an order is allocated across multiple ATS's and ECNs. Some orders may be sent to Dark ATS, an example of a non-displayed trading destination. POSIT Now, an ATS managed by ITG INC., offers continuous intra-day crossing and total anonymity. Millennium, also managed by ITG INC., is another example of a non-displayed liquidity pool. PIPELINE is an ATS that focuses on block trades. Other orders may be sent to Dark ECN. Dark ECN in an example of a non-displayed destination that allows IOC orders, which can be used to search for hidden liquidity in ECN's. Orders may also be sent to a destination called Dark Float, which uses a passive algorithm to earn spread in the open market.

Orders, or fractions of orders, that have not been executed are swept to POSIT Match. POSIT Match performs scheduled matches throughout the day and after hours. If an order has not been filled in POSIT Match, it will again be allocated to the various ATS's and ECNs.

A computer implemented liquidity aggregator process can be provided to allow traders to participate in multiple ATS's simultaneously without having to work out the mechanics of each individual ATS. Unfortunately, as described above, individual ATS's leaks trade information in varying capacities. Thus, while an aggregator will increase productivity for the trader, it introduces a problem in that the traders are unable to watch and control the orders at the individual ATS's in an effort to avoid the potential gaming of their orders at each ATS.

One aspect of the current invention relates to systems and methods of gaming prevention to be used in conjunction with a liquidity aggregator. According to one embodiment of the invention, a gaming prevention layer is provided to ensure that orders submitted to each ATS by a liquidity aggregator are protected from gaming by others, through the use, inter alia, of different inventive heuristics. Heuristics may tailored for each various ATS's, and may be more or less conservative depending on the characteristics of each ATS. As a result, liquidity aggregator customers can submit large orders without being exposed to gaming of predators at each ATS.

Figure 2:
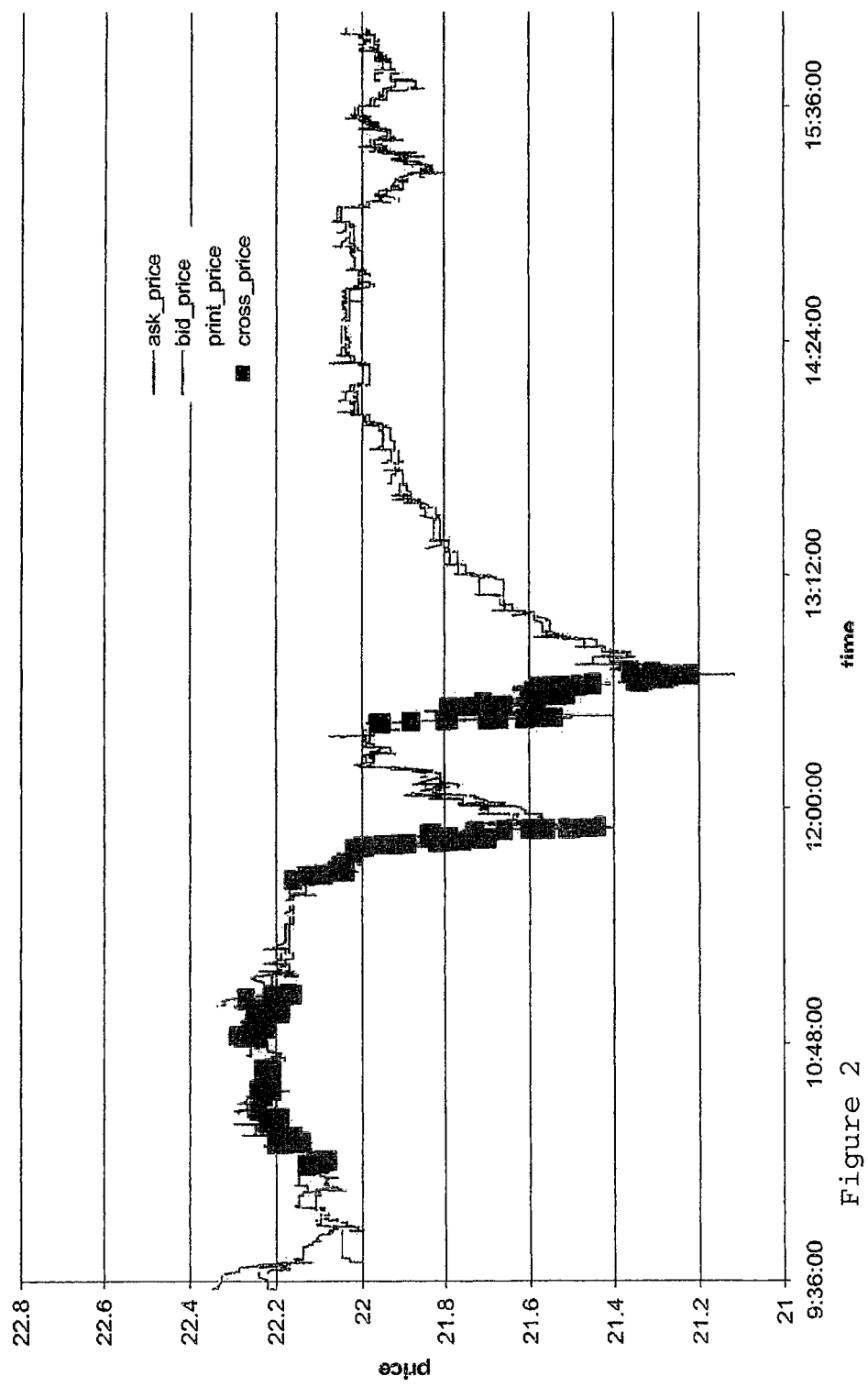
FIGS. 2-3 are illustrations of a trading period in which gaming occurs.
Figure 3:
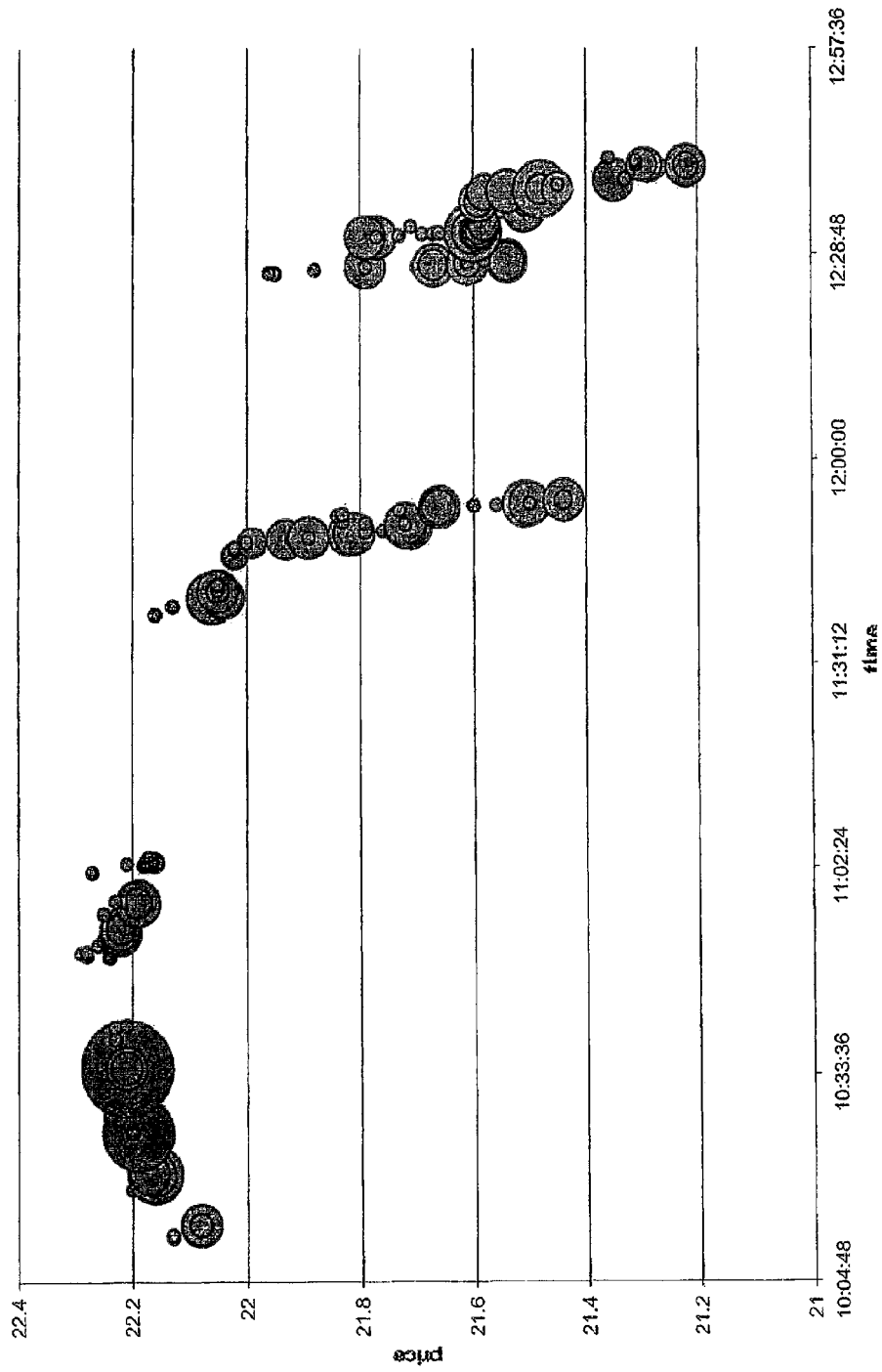

FIGS. 2-3 are graphs that illustrate trading periods during which gaming occurs. As an outside observer, it is impossible to be absolutely sure that gaming is or is not occurring, but patterns may indicate when gaming is taking place. The example, as depicted in FIGS. 2-3, illustrates patterns of activity resulting from gaming. As shown in FIG. 2, the market appears to have been driven downward around mid-day, and many trades "crossed" at prices significantly lower than the start price. According to an embodiment of the present invention, a gaming prevention policy is provided for each destination ATS. Such a policy may be configurable to different levels, such as: Strict, Medium, Loose, and None. Further, a gaming prevention policy may also be configurable at the user/trader level.

According to one embodiment of the present invention, gaming prevention logic can utilize a price collar for each order and update the price collar periodically or randomly throughout the trading day. For example, price collars could be updated at common intervals, e.g., every 30 seconds. The price collar used can be set based on whether or not gaming is detected. Examples of price collars, according to the present invention, are described in more detail below.

Gaming Detection

Aspects of gaming detection according to embodiments of the present invention are described with reference to FIGS. 2-3, which depict trading activity during a set trading period. Gaming detection logic, for example, as described below, may be continuously applied for the duration of a trading period. When gaming checks are satisfied, it will be determined that gaming has occurred. Preferably, systems and methods for preventing gaming can determine in real-time when gaming actually occurs. Further, it is preferably that actual orders from predators can be identified. The following Checks can be provided, but are not an exhaustive list of policies and are not meant to limit the invention.

Check 1—have there been "fills" (i.e., executions) corresponding to an order, i.e., symbol and sides in that destination, during the past T seconds? Since most destinations keep the liquidity hidden, as described above, predators may ping ATS's with small orders in an effort to uncover liquidity. Check 1 determines if a predatory trader has likely been able to uncover information about our order at that ATS. This check may be represented as: Number of Fills in T seconds>0.

As depicted in FIG. 2, trades may occur at various time points throughout the day. For example, assuming that the end of the second group of trades, approximately 11:30-12:00, has occurred in the last T seconds, Check 1 would identify these fills, and the first check is satisfied.

Check 2—is the fill amount a significant portion of the market volume? Stock prices are more easily manipulated if a stock is not very liquid. Thus, even if a predatory trader finds out trade information in an ATS by, e.g., pinging the ATS, the price of the stock is hard to manipulate the stock if the stock is highly traded. Therefore, if the fill amount is not for an amount that is a significant portion of market volume, then a price movement in the stock in the last T seconds is more likely due to natural price movement in the stock rather than to predatory actions of a gamer. This check may also be represented as:

(Fill/Market volume) in $T$ seconds>Coefficient 1.

Also, the time horizon can be varied. For example, if a first trader trades 400,000 shares of XYZ stock in the last T=10 minutes, and a second trader trades 4000 shares of the same XYX stock, the price at (T=–10) minutes may not be pertinent. Thus, in this case, a shorter time horizon should be used to gain pertinent information on gaming. On the other hand, if a trader trades 2000 shares of ABC stock in the last 20 minutes, out of which 1400 shares of ABC stock in a single ATS, it is necessary to look at the price 20 minutes in the past because this stock is less liquid than XYZ stock.

Referring to FIG. 3, the size of each circle represents the size of the trade. As shown, the second group of trades between 11:30-12:00 constitute a significant portion of the market volume because the total area of the circles corresponds to the total market volume.

Check 3—is there price movement during the last T seconds of a trade's opposite side that has moved upwards for BUY orders and downward for SELL orders? This check may also be represented as:

$Price_t - Price_{(t-T\ secs)} > 0$ for BUY orders and <0 for SELL orders.

In this example, it is assumed that a SELL order is being placed, and the price is going down. This is illustrated by the falling price of the executions over time.

Check 4—is price movement significant? Significant price movement can be measured by comparing the price movement for a stock with the volatility of the stock. Thus, if a volatile stock moves 20 basis points (bps) it may be acceptable, but a 20 bps price movement may satisfy this check for a less volatility stock. This check may be represented as:

$Price_t - Price_{(t-T\ secs)} >$ Coefficient 2*Volatility of the stock*price of the stock for BUY orders, and $Price_{(t-T\ secs)} - Price_t >$ Coefficient 2*Volatility of the stock*price of the stock for SELL orders.

Whether the trading period being analyzed satisfies this final check depends on the volatility of the stock and the value of coefficient 2. In this example, it is assumed that the stock is not otherwise volatile (as demonstrated by the volume of trading between 10:00 and 11:00 in FIG. 3) and that Coefficient 2 is low enough that gaming is detected.

Another form of gaming occurs when a predatory trader is buying a stock and loads an indication into the ATS screen to see if there is interest among the other ATS users. If the indication is answered, there is a buyer, seller or possibly both; however the predatory trader does not know which. The predator trader may nonetheless penny the offer in the open market with small size to move the midquote down in the predator's favor. In thinly traded stocks with wider spreads, the predatory trader may be able to move the midquote down several cents in a short period. The predatory trader then issues their original buy order to the ATS and cancels their open market limit orders. Thus, there is a 40% chance that the predatory trader gets a fill at a better price, and conversely, there is a 40% chance that nothing is done. However the predatory trader has learned that they are competing with another buyer, and can act accordingly in the open market. The risk and cost are low (only small orders used in the open market at favorable prices) to engage in this style of gaming.

One approach to anti-gaming is to set price collars to essentially prevent trading in a situation in which gaming is occurring.

Dynamic Price Collars

According to embodiments of the present invention, each order received may be given a price collar. If no gaming has been detected (e.g., by running one or more of the checks about), a price collar is applied to an order and set to the current price +X bps for BUY orders and to the current price −X bps for SELL orders. This price collar can provide enough price range for the order to be traded relative to current price, while at the same time, can prevented the order from being gamed in the next time period. X is preferably set to a small number (e.g., 2-5 basis points) that ensures that the order does not deactivate itself in absence of gaming until anti-gaming procedures are applied again. If anti-gaming procedures of the present invention are applied in a short time period, such as every 30 seconds, X may be a small number. However, if anti-gaming procedures are applied less frequently, then X should be set appropriately higher.

When gaming is detected, a price collar may be set as the $Price_{(t-T\ secs)}$ (i.e., when gaming has been determined to have occurred)+coefficient*volatility of stock*price of the stock for BUY orders and set as the $Price_{(t-T\ secs)}$−coefficient*volatility of stock*price of the stock for SELL orders. This price collar can provide enough price range for the stock to move between t-T and t, but can prevent the order from being executed at extremely poor prices, which may occur due to predatory trading activities. Note: this price collar will yield a price lower than the current price for BUY orders and a price higher than the current price for SELL orders in the presence of gaming. This can be considered to be equivalent to deactivating the order in the ATS without canceling the order. Because the order is priced passively in the ATS, it reflects the lowest fair price in absence of gaming, at which a trader is willing to trade if the predatory trader stops gaming and the price is no longer contrived.

Similar to the gaming checks provided herein, the price collar may be configured to be more or less conservative/aggressive depending on factors, such as, for example, the quality of liquidity at that ATS. For example, the coefficients described above may be set to be higher in value for a high quality liquidity ATS.

Figure 4:
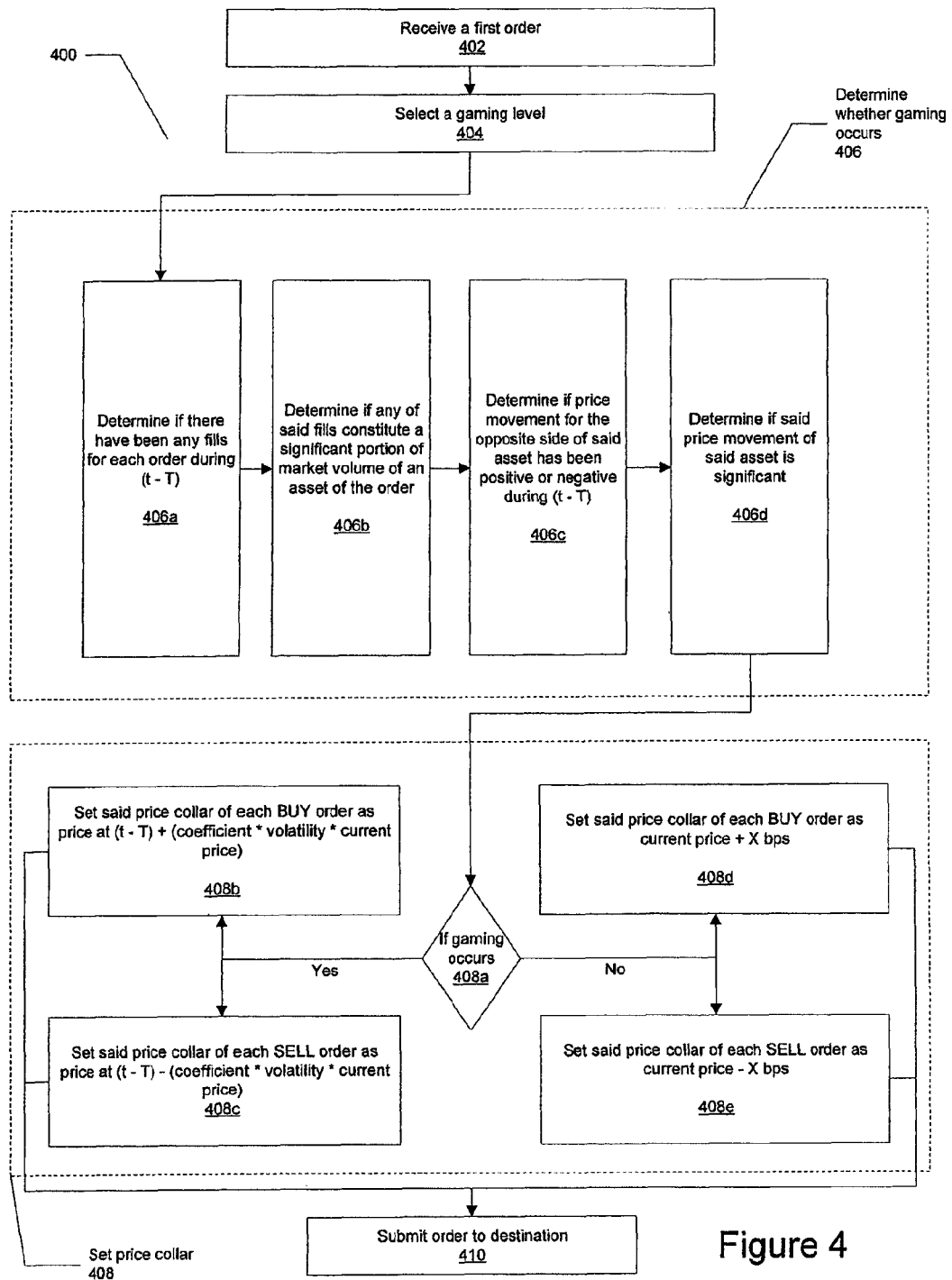
FIG. 4 is a flow chart of an exemplary method for preventing gaming according to the present invention.

FIG. 4 is a flow chart of an exemplary method for preventing game in a trading system according to an embodiment of the present invention. Method 400 begins at step 402 in which a first order is received. Other orders may be received, some of which may be for any variety of trading destinations. The method may then continue to step 404, in which a gaming level is chosen. Gaming levels may have numeric values or may have levels. In some embodiments, step 404 may be omitted, and in other embodiments, step 404 may be performed automatically.

Next, as step 406, it is determined whether gaming is occurring based on the plurality of orders. Gaming may be determined consistent with the checks disclosed above. In this embodiment, four steps 406a-d are performed.

At step 406a, it is determined whether there have been any fills for each order during a past selectable number of seconds, e.g. t-T seconds. Such a determination may be made based on analysis of execution data acquired from an ATS.

At step 406b, it is determined if any of the fills constitute a significant portion of market volume of an asset of the order. In some embodiments, the portion that constitutes a significant portion may be changed dynamically. In other embodiments, the portion that constitutes a significant portion may be static. Such a determination may be made based on analysis of execution data acquired from an ATS.

At step 406c, it is determined if price movement for the opposite side of the asset has been positive or negative during a past user selectable number of seconds. In some embodiments, this user selectable number of seconds may be the same value as in step 406a. In others, these two values may be different.

At step 406d, it is determined if the price movement of the asset is significant. In some embodiments, the amount of movement that is significant may be changed dynamically. In other embodiments, the amount of movement that is significant may be static. In this embodiment, if steps 406a-d are determined in the affirmative, then step 406 is determined to affirmative and gaming is determined to exist.

At step 408, a price collar is set for each order in the plurality based on results of steps 406 and 404. Step 408a asks if gaming occurs. If the answer to this inquiry is yes (output from step 406), the method may perform step 408b and/or 408c. At step 408b, the price collar of each BUY order is set as a price of an asset at a time that is a user selectable number of seconds in the past added to a quantity of a coefficient multiplied by a volatility of said asset multiplied by a current price of the asset.

At step 408c, the price collar of each SELL order is set as a price of said asset at a time that is a user selectable number of seconds in the past minus a quantity of a coefficient multiplied by a volatility of said asset multiplied by a current price of said asset.

If step 406a is not true, i.e. NO, the method may perform steps 408d and/or 408e. At step 408d, price collar of each BUY order is set as a current price of an asset added to a user selectable number of basis points. At step 408e, the price collar of each SELL order is set as a current price of an asset added to a user selectable number of basis points.

At step 410, each order is submitted to the alternative trading system with the price collar.

Figure 5:
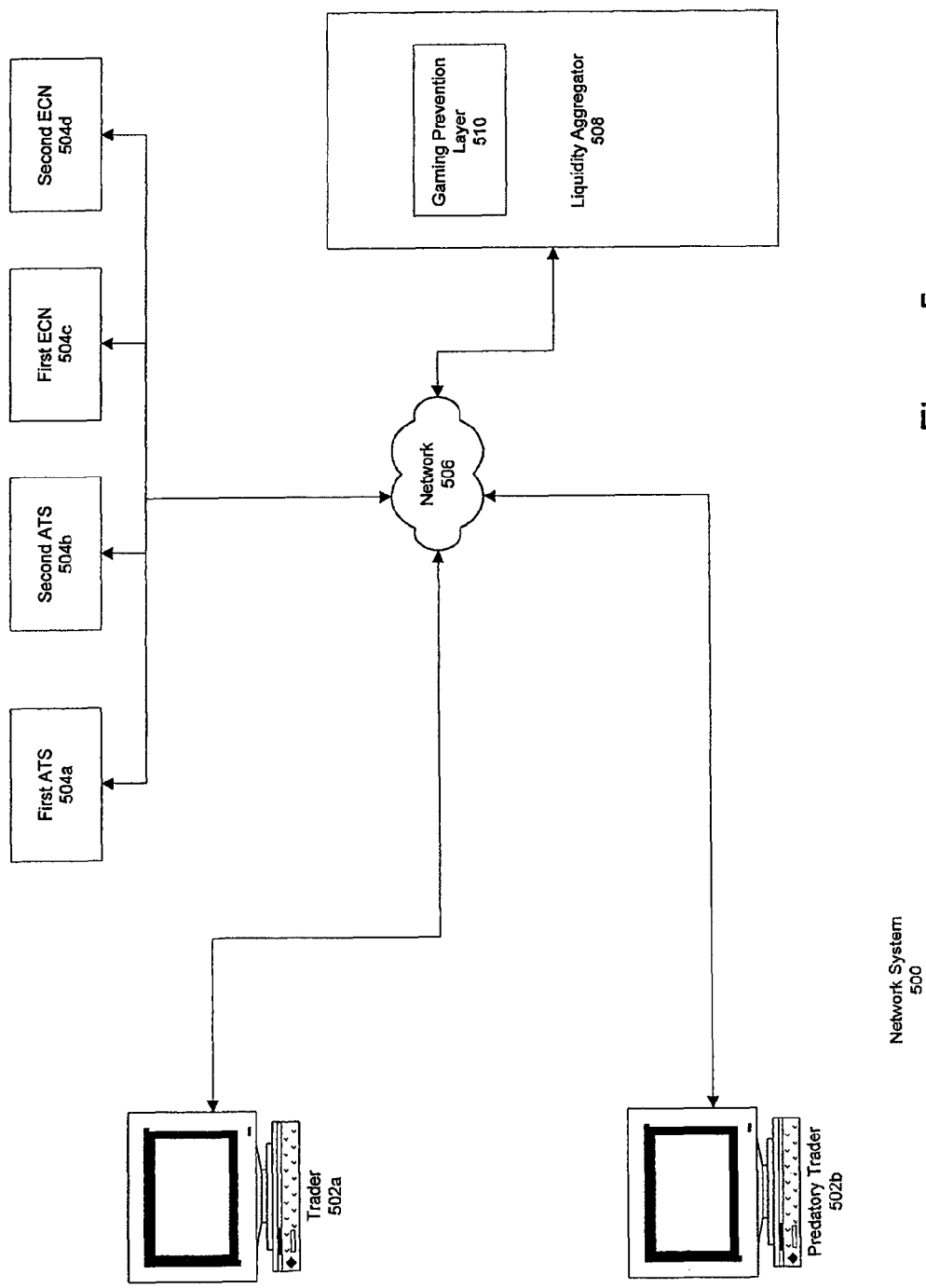
FIG. 5 is a block diagram of an exemplary trading system that include facilities for preventing gaming according to the present invention.

FIG. 5 is a block diagram of a trading system that includes facilities for preventing gaming according to an embodiment of the present invention. In the depicted network system 500, a trader may connect to a trading destination 504 via a trading client 502a via an electronic data network 506. The trading client could include a number of available order management or execution management systems that provide electronic trading facilities and/or access to trading services. The electronic connection could include a proprietary connection, FIX connection, or other known connections for transmission of electronic trade orders, and may utilize a proprietary network, the internet and world wide web, wireless electronic networking, etc.

Trading destinations 504 may include a first ATS 504a, a second ATS 504b, a first ECN 504c and a second ECN 504d. The first ATS 504a may offer different liquidity than the second ATS 504b due to differing policies and/or variable characteristics of the individual ATS's. Trading client 502a may also be connected to an ECN 504c, 504d, or may connect to a combination of trading destinations 504.

The client 502a may transmit trade orders to a liquidity aggregator 508. As described above, the liquidity aggregator may be configured to find hidden liquidity in various trading destinations 504. The trader 502a may send a large buy order (not shown) to the liquidity aggregator 508 across the network 506. The liquidity aggregator 508 may be configured to allocate the large order into multiple, smaller orders (not shown). The liquidity aggregator 508 may be configured to route each of these smaller orders to different trading destinations 504 across a network 506. The liquidity aggregator 508 may be configured to generate a number of combinations of orders and trading destinations 504, as described above. The trading destinations 504 will send results of the smaller orders to the liquidity aggregator 508 across the network 506. The liquidity aggregator 608 will report relevant results to the trader 502a across the network 506.

In addition to the trader 502a, the network system 500 may also include a variety of other trade clients, including a predatory trader 502b. The term "predatory" relates to the strategy of trader 502b and does not necessarily signify a different apparatus than the any other trade client.

A predatory trader 502b may try to game trading destinations 504 in order to profit at the expense of other traders. The predatory trader 502b may send orders to a liquidity aggregator 508 just as the trader 502a might.

According to embodiments of the present invention, the liquidity aggregator 508 can include facilities for preventing gaming, referenced in FIG. 5 as gaming prevention layer 510. Alternatively the gaming prevention layer could be included within an ATS or be executed as a separate computer server or the like. As described elsewhere, the gaming prevention layer 510 may set price collars, or other techniques, to ensure that the trades being executed by a trader 502a are not subject to gaming. The trader 502a may place a variety of orders to the liquidity aggregator 508, which may in turn place multiple orders to both the second ATS 504b and the first ECN 504c. The predatory trader 502b may then place predatory orders to the second ATS 504b. The gaming prevention layer 510 is configured to detect these practices, such as by application of the one or more of the processes described above, and to prevent the orders from being filled at the second ATS 504b while the predatory trading is occurring. The gaming prevention layer 510 may continue to leave orders to the first ECN 504c unchanged as no gaming is occurring.

The present invention can be implemented with many known computer and network architectures, with an appropriate combination of hardware, software and/or firmware. One skilled in the art would understand that the data required to perform the above-described processes can be acquired from known sources. Accordingly, other facilities may be accessed or included in order to support the features of the present invention.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

I claim:

1. A computer implemented method for aggregating liquidity while preventing gaming of trade orders, said method comprising:
    receiving electronic data for a block trade order at a liquidity aggregator computer;
    transmitting a plurality of electronic sub-orders to a plurality of trade destinations based on said block trade order;
    electronically monitoring said plurality of trade destinations;
    determining whether a predatory order exists in a first one of said plurality of trade destination; and
    modifying each electronic said sub-order in said first trade destination to include a price collar based on results of said determining step, said price collar defining a price range outside of which the corresponding order is prevented from trading.

2. The method as claimed in claim 1, further including a step of setting a gaming level based on at least one of the following: liquidity quality factors at said alternative trading system, types of users, minimum order limitations, allowance of "immediate or cancel" orders, criteria for signaling out information to traders, proprietary quality control checks already in place, and allowance of proprietary trades, and
    wherein in said modifying step, the price collar is selected further based upon said gaming level.

3. The method as claimed in claim 1, wherein the determining step further comprises steps of:
    determining if there have been any executed orders corresponding to any of the plurality of sub-orders during selected time period;
    if executed orders exist, determining if any of said executed orders constitute a significant portion of market volume of the asset of the order;
    determining if price movement for the opposite trade side of each order has been positive or negative during said selected time period; and
    determining if said price movement of said asset is significant.

4. The method as claimed in claim 3, wherein the step of determining if any of said fills constitute a significant portion of market volume further comprises:
    determining if an amount of said fill divided by a market volume of said asset during a user selectable number of seconds is greater than a coefficient 1, wherein said coefficient 1 is based on each alternative trading system's liquidity.

5. The method as claimed in claim 3, wherein the step of determining if price movement for the opposite side of said asset has been positive or negative further comprises:
    determining, for a BUY sub-order, if a current price minus the price of said asset at a time that is a user selectable number of seconds in the past is greater than 0; or
    determining, for a SELL sub-order, if a current price minus the price of said asset at a time that is a user selectable number of seconds in the past is less than 0.

6. The method as claimed in claim 3, wherein the step of determining if said price movement of said asset is significant further comprises:
    determining, for a BUY sub-order, if a current price minus a price of said asset at a time that is a user selectable number of seconds in the past is greater than a quantity of coefficient 2 multiplied by a volatility of said asset multiplied by a current price of said asset; or
    determining, for a SELL sub-order, if a price at a time that is a user selectable number of seconds in the past minus a current price said asset is greater than a quantity of coefficient 2 multiplied by a volatility of said asset multiplied by a current price of said asset;
    wherein said coefficient 2 is based on each alternative trading system's liquidity.

7. The method as claimed in claim 1, wherein the modifying step further comprises steps of:
    when no predatory order is found, setting said price collar of each BUY sub-order as a current price of an asset added to a user selectable number of basis points, and setting said price collar of each SELL sub-order as a current price of an asset added to a user selectable number of basis points.

8. The method as claimed in claim 1, wherein the modifying step further comprises: if gaming occurs, when a predatory order is found, setting said price collar of each respective BUY sub-order as a price of an asset at a time that is a user selectable number of seconds in the past added to a quantity of a coefficient multiplied by a volatility of said asset multiplied by a current price of said asset, or setting said price collar of each respective SELL sub-order as a price of said asset at a time that is a user selectable number of seconds in the past minus a quantity of a coefficient multiplied by a volatility of said asset multiplied by a current price of said asset.

9. The method as claimed in claim 1, further comprising selecting a gaming level from a range of gaming levels for said alternative trading system, wherein the step of setting a price collar is further based on a result of the selecting a gaming level step.

10. A computer implemented system for preventing gaming in electronic trading, said system comprising:

a liquidity aggregator computer electronically coupled with a plurality of trader clients and a plurality of trade destinations and configured to receive electronically a block trade order, to transmit a plurality of electronic sub-orders to a plurality of trade destinations based on said block trade order, to monitor said plurality of trade destinations, to determine whether a predatory order exists in a first one of said plurality of trade destination, and to modify each said electronic sub-order in said first trade destination to include a price collar based on results of said determining step, said price collar defining a price range outside of which the corresponding order is prevented from trading.

11. The system as claimed in claim 10, wherein said liquidity aggregator computer is further configured to set a gaming level based on at least one of the following: liquidity quality factors at said alternative trading system, types of users, minimum order limitations, allowance of "immediate or cancel" orders, criteria for signaling out information to traders, proprietary quality control checks already in place, and allowance of proprietary trades, and the price collar is selected further based upon said gaming level.

12. The system as claimed in claim 10, wherein said liquidity aggregator computer is further configured to determine if there have been any executed orders corresponding to any of the plurality of sub-orders during selected time period, if executed orders exist, to determine if any of said executed orders constitute a significant portion of market volume of the asset of the order;

to determine if price movement for the opposite trade side of each order has been positive or negative during said selected time period, and to determine if said price movement of said asset is significant.

13. The system as claimed in claim 12, wherein said liquidity aggregator computer is further configured to determine if an amount of said fill divided by a market volume of said asset during a user selectable number of seconds is greater than a coefficient 1, wherein said coefficient 1 is based on each alternative trading system's liquidity.

14. The system as claimed in claim 12, wherein said liquidity aggregator computer is further configured to determine, for a BUY sub-order, if a current price minus the price of said asset at a time that is a user selectable number of seconds in the past is greater than 0; or to determine, for a SELL sub-order, if a current price minus the price of said asset at a time that is a user selectable number of seconds in the past is less than 0.

15. The system as claimed in claim 12, wherein said liquidity aggregator computer is further configured to determine, for a BUY sub-order, if a current price minus a price of said asset at a time that is a user selectable number of seconds in the past is greater than a quantity of coefficient 2 multiplied by a volatility of said asset multiplied by a current price of said asset; or to determine, for a SELL sub-order, if a price at a time that is a user selectable number of seconds in the past minus a current price said asset is greater than a quantity of coefficient 2 multiplied by a volatility of said asset multiplied by a current price of said asset;

wherein said coefficient 2 is based on each alternative trading system's liquidity.

16. The system as claimed in claim 10, wherein said liquidity aggregator computer is further configured to set, when no predatory order is found, said price collar of each BUY sub-order as a current price of an asset added to a user selectable number of basis points, and setting said price collar of each SELL sub-order as a current price of an asset added to a user selectable number of basis points.

17. The system as claimed in claim 10, wherein said liquidity aggregator computer is further configured to set, when a predatory order is found, said price collar of each respective BUY sub-order as a price of an asset at a time that is a user selectable number of seconds in the past added to a quantity of a coefficient multiplied by a volatility of said asset multiplied by a current price of said asset, or to set said price collar of each respective SELL sub-order as a price of said asset at a time that is a user selectable number of seconds in the past minus a quantity of a coefficient multiplied by a volatility of said asset multiplied by a current price of said asset.

18. The system as claimed in claim 10, wherein said liquidity aggregator computer is further configured to select a gaming level from a range of gaming levels for said alternative trading system, wherein the step of setting a price collar is further based on a result of the selecting a gaming level step.

* * * * *